United States Patent Office 2,888,435
Patented May 26, 1959

2,888,435

VINYL HALIDE RESIN CONTAINING A SUBSTITUTED TIN MERCAPTIDE

James M. Wallace, Jr., Cuyahoga Falls, Ohio, assignor, by mesne assignments, to The Goodyear Tire & Rubber Company, a corporation of Ohio No Drawing. Application August 27, 1952
Serial No. 306,734

5 Claims. (Cl. 260—45.75)

This invention relates to the stabilization of vinyl halide resins and particularly to the use of tin mercaptides for stabilizing vinyl resins against discoloration.

Vinyl halide resins will discolor when heated, for example at temperatures of 100° C. or higher, and especially in the presence of iron and iron salts. It has been discovered that the addition of a small proportion of a tin mercaptide having the general formula $$(RS)_{4-x}Sn(R')_x$$

where $x$ has a value of 0, 1, 2 or 3 and R and R' may be any organic radical, effectively stabilizes the resin against discoloration by heat.

The vinyl halide resins that may be advantageously stabilized in accordance with the present invention include polyvinyl chloride, and the copolymers of vinyl chloride and other polymerizable mono-olefinic compounds which are compatible with the vinyl halide in polymeric form, that is, which form copolymers with a vinyl halide, including vinyl acetate, methyl methacrylate, vinylidene chloride, aliphatic fumarates, for example dimethyl fumarate and diethyl fumarate, the aliphatic maleates, for example dimethyl maleate and diethyl maleate, and the aliphatic acrylates, for example ethyl acrylate. The vinyl halide copolymers that may be stabilized in accordance with this invention are copolymers of from 50 to 98% of a vinyl halide, as for example vinyl chloride, and from 2 to 30% of another copolymerizable olefinic compound. Polyvinyl chloride is particularly advantageously stabilized with the mercaptides of this invention.

The stabilization of the vinyl halide resins against discoloration upon heating is achieved by the addition of the tin mercaptides of this invention to the resin. The mercaptide stabilizers may be added prior to polymerization of the monomers used in making the resin or after the resin has been formed, and preferably during compounding of the resin on a mill. It is preferred to add the stabilizer to the solid resin and mix therein by means of a mixing machine adapted to blend solid plastic materials. The mixing machine may be heated during the mixing operation to render the resin more plastic. Another method of adding the stabilizer is through the use of a solvent in which the stabilizing agent is dissolved and the solution then mixed with the copolymer. Another method is to dissolve the resin in a solvent and then add the stabilizing agent to the solution which is then dispersed throughout the solution by means of any stirring device. As indicated above, the stabilizer may be added to an aqueous emulsion of the resin and distributed throughout the resin polymer prior to coagulation.

The quantity of stabilizer used will depend upon the severity of the heating to which the vinyl resin is to be subjected. Even traces of the agent will produce a beneficial result where only mild heating is to be encountered. The mercaptide stabilizers may be used in amount from 0.05 to 10% by weight, and generally it is desirable to use from 0.5 to 5% of stabilizer.

The stabilized resins may be used in the preparation of cast films or in the fabrication of molded or extruded shapes, which uses are well known in the art. The stabilized vinyl halide resins are particularly useful in the preparation of transparent or light-colored articles in which discoloration upon heating is undesirable.

Organic tin mercaptides having the general formula indicated above are prepared by reacting an organic mercaptan with stannic chloride. When stoichiometric equivalent quantities of mercaptan and stannic chloride are used, one class of the tin mercaptides of this invention is prepared directly in one step, namely, the subclass of mercaptides having the general formula $(RS)_4Sn$. When an excess of stannic chloride is used in reaction with an organic mercaptan, then the corresponding chloride is prepared having the general formula $(RS)_{4-x}Sn(Cl)_x$ in which $x$ is 1, 2 or 3 and R is any organic radical. These tin chlorides are then converted by means of a Grignard reaction in which the desired organic magnesium bromide compound is reacted to form the corresponding tin mercaptide having the general formula $(RS)_{4-x}Sn(R')_x$ in which $x$ has a value of 1, 2 or 3.

Any organic mercaptan of the general formula RSH may be reacted with a stannic halide, for example stannic chloride. Classes of organic mercaptans that may be used include the aliphatic and particularly the alkyl mercaptans, the aromatic and particularly the aryl mercaptans, and the heterocyclic mercaptans. Examples of the mercaptans include methyl mercaptan, ethyl mercaptan, butyl mercaptan, cetyl mercaptan, lauryl mercaptan, phenyl mercaptan, paramethyl phenyl mercaptan, abietyl mercaptan, alkaryl mercaptans, alkenyl mercaptans, alicyclic mercaptans, anthryl mercaptan, aralkenyl mercaptans, benzyl mercaptan, biphenylyl mercaptan, boronyl mercaptan, camphanyl mercaptan, cinnamyl mercaptan, cresyl mercaptan, crotyl mercaptan, cyclohexenyl mercaptans, cyclohexyl mercaptan, fenchyl mercaptan, furfuryl mercaptan, furyl mercaptan, geranyl mercaptan, hendecyl mercaptan, menthyl mercaptan, naphthyl mercaptan, octyl mercaptan, piperazinyl mercaptan, and piperidyl mercaptan.

The resulting tin halide derivatives of these mercaptans may be converted to the corresponding organo tin mercaptides by reacting any desired organic magnesium halide of the general formula R'MgX with the halide derivative of the mercaptan having the general formula $$(RS)_{4-x}Sn(Cl)_x$$

to produce the stabilizer of this invention having the general formula $(RS)_{4-x}Sn(R')_x$. The Grignard reagents having the general formula R'MgX in which X is a halide may be used in which the value of R' is selected from the values described for R in the mercaptans listed above having the general formula RSH.

The following examples set forth further details of the invention showing the manner in which a mercaptide of this invention was used in stabilizing a vinyl resin. The general formulation used in testing the stabilizers of this invention was as follows:

| | Parts |
|---|---|
| Vinyl chloride resin | 100 |
| Plasticizer (dibutyl sebacate) | 33 |
| Stabilizer | 0.25 to 4.0 |

The following table shows the specific results when using cetyl tin mercaptide in various amounts ranging from .10 to 4.00 parts per 100 parts of resin:

Table I

| Example | Percent Tetra Cetyl Tin Mercaptide | Comparison of Discoloration |
|---|---|---|
| 1 | 4.00 | At 60 min. equal to control at 15 min. |
| 2 | 2.00 | At 40 min. equal to control at 15 min. |
| 3 | 1.00 | At 60 min. better than control at 15 min. |
| 4 | 0.50 | At 60 min. better than control at 10 min. |
| 5 | 0.25 | At 60 min. slightly worse than control at 15 min. but better than control at 25 min. |
| 6 | 0.10 | At 60 min. slightly worse than control at 15 min. but better than control at 25 min. |

The following table shows the results when using lauryl tin mercaptide:

Table II

| Example | Percent Tetra Lauryl Tin Mercaptide | Comparison of Discoloration |
|---|---|---|
| 7 | 2 | At 45 min. equal to control at 25 min. |
| 8 | 1 | At 45 min. better than control at 15 min. |
| 9 | .5 | At 60 min. better than control at 15 min. |

The following table shows the results obtained when using .5 part of the indicated mercaptide per 100 parts of the vinyl resin:

Table III

| Example | Mercaptide | Comparison of discoloration |
|---|---|---|
| 10 | tetra p-methyl phenyl tin mercaptide. | At 45 min. better than control at 15 min. |
| 11 | tetra ethyl tin mercaptide. | At 15 min. better than control at 10 min. |
| 12 | mixture of butyl tin lauryl mercaptides. | At 60 min. better than control at 15 min. |

In the examples listed above the results are given in comparison to tests run on an identical resin used as the control in which no stabilizer was used. The control was milled until it had become badly discolored. The stabilized resin was also milled until it became discolored to the same extent observed for the control and the time then recorded. It will be noted that in most of the examples it took 100% more time to discolor the stabilized resin than was taken in discoloring the control resin. More specifically the method of testing the heat stability of the vinyl resins comprised adding a 750 gram batch of the resin to be tested to mill rolls set at 190°–200° F. The batch was banded as quickly as possible and sheeted off. The batch was then put on mill rolls set for 320° F. As soon as a sheet was formed on the roll a sample 2″ x 4″ was cut and marked "original." Additional samples were taken at intervals of 5, 10, 15, 25, 35, 45, and 60 minutes.

The mixture of butyl tin lauryl mercaptides used in Example 12 were made by reacting 2 mols of a commercial grade of lauryl mercaptan containing predominately $C_{12}H_{25}SH$ with 1 mol of stannic chloride $SnCl_4$ at 80 to 90° C. until all of the HCl was removed to get primarily $(C_{12}H_{25}S)_2SnCl_2$ which was then cooled to room temperature and dissolved in an hydrous ether then reacted with 2 mol of Grignard reagent $C_4H_9MgBr$ (butyl magnesium bromide) to get a reaction product containing primarily $(C_{12}H_{25}S)_2Sn(C_4H_9)_2$. However some mercaptides having the formula $(C_{12}H_{25})Sn(C_4H_9)_3$; $(C_{12}H_{25}S)_3Sn(C_4H_9)$ and $(C_{12}H_{25}S)_4Sn$ were also present. The reaction product was added to a mixture of concentrated ammonium chloride and crushed ice to decompose the complex and then the organic layer was separated from the aqueous layer. The organic layer was dried. This was the mixture of mercaptides used in Example 12.

While certain representative embodiments and details have been shown for the purpose of illustrating the invention, it will be apparent to those skilled in this art that various changes and modifications may be made therein without departing from the spirit or scope of the invention.

I claim:
1. A vinyl halide resin containing tetra (p-methylphenyl) tin mercaptide.
2. A vinyl halide resin containing tetra cetyl tin mercaptide.
3. A vinyl halide resin containing tetra lauryl tin mercaptide.
4. A vinyl halide resin containing tetra ethyl tin mercaptide.
5. A vinyl halide resin containing a stabilizing agent selected from the group consisting of tetra (p-methylphenyl) tin mercaptide, tetra cetyl tin mercaptide, tetra lauryl tin mercaptide, and tetra ethyl tin mercaptide.

References Cited in the file of this patent

UNITED STATES PATENTS

| 2,641,588 | Leistner et al. | June 9, 1953 |
| 2,726,227 | Leistner et al. | Dec. 6, 1955 |
| 2,731,440 | Stefl et al. | Jan. 17, 1956 |

UNITED STATES PATENT OFFICE

CERTIFICATE OF CORRECTION

May 26, 1959

Patent No. 2,888,435

James M. Wallace, Jr.

It is hereby certified that error appears in the printed specification of the above numbered patent requiring correction and that the said Letters Patent should read as corrected below.

Column 4, line 15, for "an hydrous" read -- anhydrous --; line 19, for "$C_{12}H_{25})Sn(C_4H_9)_3$" read -- $(C_{12}H_{25}S)Sn(C_4H_9)_3$ --.

Signed and sealed this 6th day of October 1959.

(SEAL)
Attest:

KARL H. AXLINE
Attesting Officer

ROBERT C. WATSON
Commissioner of Patents